2 Sheets--Sheet 1.

J. W. ROSS.
Water-Wheel.

No. 6,285. Reissued Feb. 9, 1875.

Witnesses.
A. Ruppert.
M. N. Severance

J. W. Ross
Inventor.
D. P. Holloway & Co
Attys

J. W. ROSS.

Water-Wheel.

No. 6,285. Reissued Feb. 9, 1875.

Witnesses.
A. Ruppert.
H. W. Severance

J. W. Ross
Inventor.
D. P. Holloway & Co
Attys

UNITED STATES PATENT OFFICE.

JOHN W. ROSS, OF DELPHOS, OHIO, ASSIGNOR OF ONE-HALF INTEREST TO JOSEPH W. HUNT, OF SAME PLACE.

IMPROVEMENT IN WATER-WHEELS.

Specification forming part of Letters Patent No. 152,515, dated June 30, 1874; reissue No. 6,285, dated February 9, 1875; application filed January 12, 1875.

*To all whom it may concern:*

Figure 1:
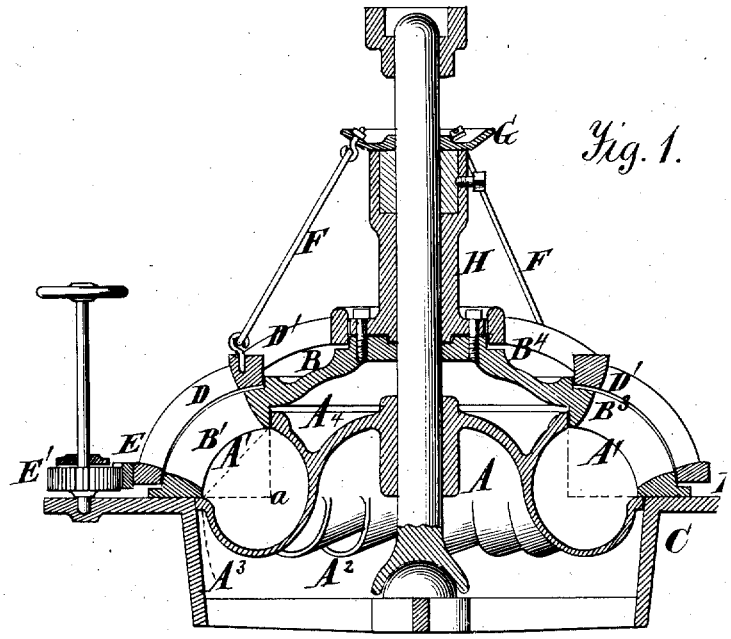
Figure 2:
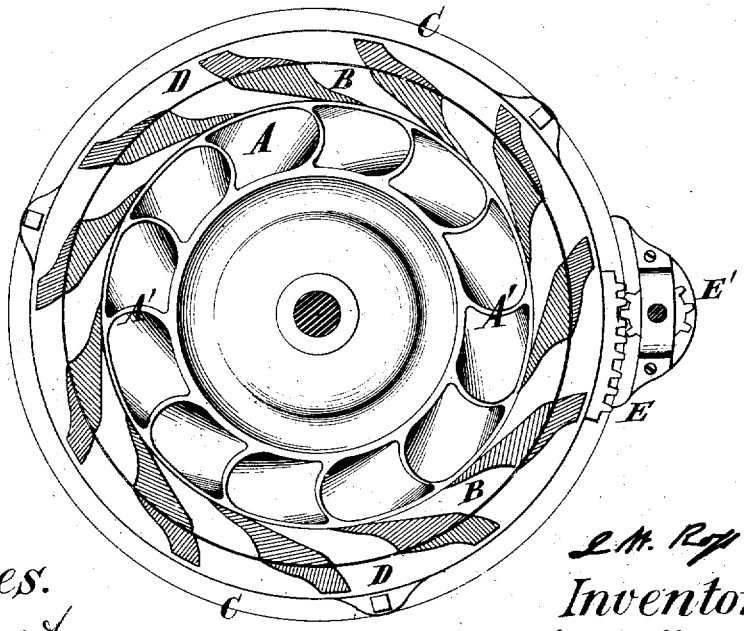
Figure 3:
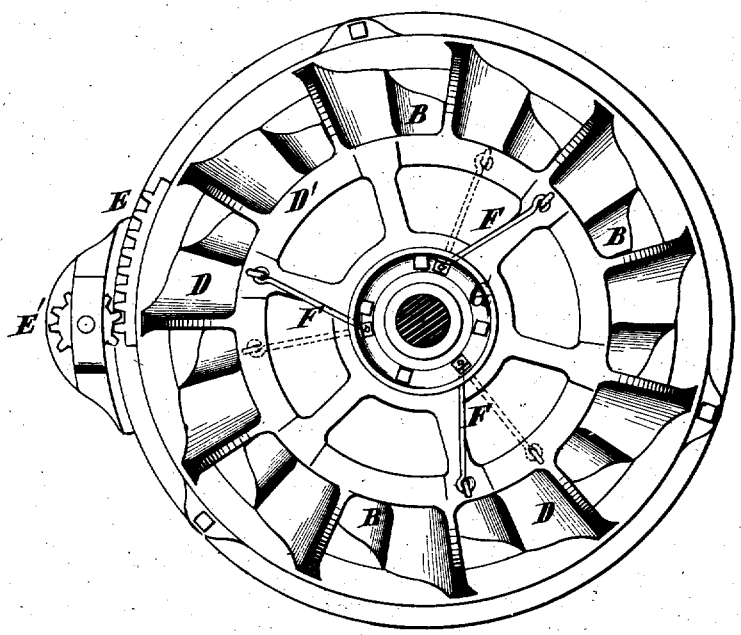
Figure 4:
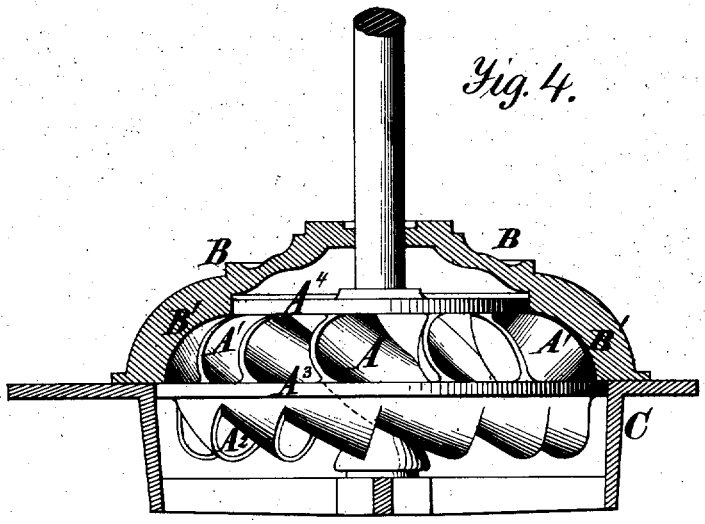

Be it known that I, JOHN W. ROSS, of Delphos, in the county of Allen and State of Ohio, have invented a new and useful Improvement in Turbine Water-Wheels, of which the following is a specification:

In the annexed drawings, making a part of this specification, Figure 1 is a transverse vertical section. Fig. 2 is a horizontal section. Fig. 3 is a plan view; and Fig. 4 is a section of the casing, and an elevation of the wheel.

The same letters are employed in all the figures in the indication of identical parts; and the points of novelty by which it is distinguished from other water-wheels will be indicated in the following description and claims.

A is the wheel, and is securely fastened to the shaft, which rests upon a step, as in other horizontal wheels. The buckets of the wheel between the flanges $A^3$ and $A^4$ are formed on a true curve or arc of ninety degrees, or thereabout, struck from the angle *a*, where ideal lines drawn at right angles to one another intersect, forming quadrant-shaped projections $A^1$, which receive the water entering between the guides and divert it, so that, bearing against the faces of the buckets curved as shown, it shall emerge through the issues $A^2$, and escape vertically through the tube C, changing its direction in passing through the wheel from an angle of about forty-five degrees, at which it enters, to a vertical line, in which it is discharged into the tail-race.

The tube C has a flange, which rests on the floor of the fore-bay in the usual manner. On this flange rests a dome-formed casing, B, forming at its junction with the flange a water-tight joint. It entirely covers the wheel, and has bolted onto its top a sleeve, which incases the shaft, and forms a bearing at the upper end.

At the bottom and in the inner face of the casing is a quadrant-formed recess, B′, corresponding to the quadrant curves $A^1$ on the upper edge of the buckets, which turn therein, fitting closely, but not touching. In the shell of this recess are a series of openings, forming guides to give the proper direction to the entering water, and so shaped as to deliver the water directly against the faces of the buckets.

Outside the guides is a ring, D, resting on flanges on the dome B, and formed with openings corresponding in form and position to the guide-openings through the dome, and having blank spaces between sufficient to cover the guide-openings. This ring forms a register-gate, and by turning it, by means of the rack E and pinion E′, the water may be entirely shut off from the wheel, or admitted through orifices entirely or partially open.

The register-gate would turn on the flanges on which it rests, but with considerable friction, and liability to derangement from the deposition of sediment in and about the joint. To avoid this, the gate-ring is hung on rods F, fastened to the stationary collar G on the sleeve H.

As these rods hang vertically, or in vertical planes, when the gates are closed, and are fixed at their upper ends, it follows that as the gate-ring is turned it will at the same time be lifted from its seat by the rods, and thus the current of water admitted to sweep the sediment from the flanges, which form the seats for the gate-ring.

The gate-ring corresponds in general form with the dome B, and has its seat, when the gates are closed, on a series of flanges or seats formed on the dome at $B^2$ $B^3$ $B^4$.

What I claim as my invention, and desire to secure by Letters Patent, is—

1. The wheel A, constructed with buckets concave at the bottom, both longitudinally and transversely, and terminating at the top with the quadrant curve $A^1$, substantially as set forth.

2. In combination with the wheel having its buckets terminating above in a quadrant curve, as shown at $A^1$, a dome-formed casing, B, having a quadrant concavity, $B^1$, adapted to the form of the wheel, substantially as set forth.

3. In combination with the dome-formed casing B, a correspondingly-formed register-gate, having its bearings on flanges or seats formed on the dome B, substantially as shown.

4. The register-gate ring D, in combination with the rods F and stationary collar G, so arranged that when the former is turned, it shall be raised from its seat, substantially as set forth.

As witness my hand in the presence of two subscribing witnesses.

JOHN W. ROSS.

Executed in presence of—
W. F. DOLBY,
B. J. BROTHERTON.